United States Patent
Macpherson et al.

(10) Patent No.: US 8,248,266 B2
(45) Date of Patent: Aug. 21, 2012

(54) BIDIRECTIONAL TELEMETRY APPARATUS AND METHODS FOR WELLBORE OPERATIONS

(75) Inventors: John D. Macpherson, Sugarland, TX (US); Frank W. Shepard, Houston, TX (US); Ralf Zaeper, Hannover (DE); Volker Krueger, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 892 days.

(21) Appl. No.: 12/352,390

(22) Filed: Jan. 12, 2009

(65) Prior Publication Data

US 2009/0115623 A1 May 7, 2009

Related U.S. Application Data

(62) Division of application No. 11/431,736, filed on May 10, 2006, now Pat. No. 7,477,161.

(60) Provisional application No. 60/679,406, filed on May 10, 2005.

(51) Int. Cl.
*G01V 3/00* (2006.01)

(52) U.S. Cl. ............... 340/853.3; 324/338; 342/350

(58) Field of Classification Search ............ 340/854.3, 340/583.7, 855.1; 175/40; 403/23, 78; 439/13
See application file for complete search history.

(56) References Cited

U.S. PATENT DOCUMENTS

| | | | |
|---|---|---|---|
| 4,715,451 A | 12/1987 | Bseisu | |
| 4,884,071 A | 11/1989 | Howard | |
| 5,144,298 A | 9/1992 | Henneuse | |
| 5,568,448 A | 10/1996 | Tanigushi et al. | |
| 6,230,557 B1 | 5/2001 | Ciglenec et al. | |
| 6,320,820 B1 | 11/2001 | Gardner et al. | |
| 6,903,660 B2 * | 6/2005 | Clark et al. | 340/854.8 |
| 7,193,527 B2 * | 3/2007 | Hall et al. | 340/854.3 |
| 2004/0156264 A1 | 8/2004 | Gardner et al. | |
| 2005/0087368 A1 | 4/2005 | Boyle et al. | |

* cited by examiner

*Primary Examiner* — Albert Wong
(74) *Attorney, Agent, or Firm* — Cantor Colburn LLP

(57) ABSTRACT

A system and method for communicating data between a downhole tool and a surface controller is provided that comprises a rotating drill string extending in a borehole and having a downhole telemetry module disposed proximate a bottom end thereof and transmitting a first signal across a telemetry channel. A surface telemetry module is disposed proximate a top end of the rotating drill string and is adapted to receive the first signal transmitted by the downhole telemetry module across the transmission channel. The surface telemetry module has a radio frequency transmitter disposed therein for transmitting a second signal related to the first signal. A stationary communication module has a radio frequency receiver adapted to receive the second signal.

19 Claims, 3 Drawing Sheets

BIDIRECTIONAL TELEMETRY APPARATUS AND METHODS FOR WELLBORE OPERATIONS

CROSS-REFERENCE TO RELATED APPLICATIONS

This application is a divisional application of U.S. patent application Ser. No. 11/431,736, filed on May 10, 2006, which takes priority from U.S. patent application Ser. No. 60/679,406 filed on May 10, 2005, which is incorporated herein by reference in its entirety.

BACKGROUND OF THE INVENTION

1. Field of the Invention

This invention relates to data telemetry apparatus and methods for oilfield wellbore operations.

2. Description of the Related Art

A variety of communication and transmission techniques have been used to provide real time data from the vicinity of a drill bit to the surface during drilling. The utilization of measurement-while-drilling (MWD) sensors with real time data transmission provides substantial benefits during a drilling operation. For example, continuous monitoring of downhole conditions allows for a prompt response to potential well control problems and results in improved drilling efficiency and hole cleaning.

MWD systems provide drilling operators greater control over the construction of a well by providing information about conditions at the bottom of a wellbore substantially in real time as the wellbore is being drilled. Certain information is of interest to drilling operators, and is preferably obtained from the bottom of the wellbore substantially in real time. This information commonly includes directional drilling variables such as inclination and direction (azimuth) of the drill bit, and geological formation data, such as natural gamma ray radiation levels and electrical resistivity of the rock formation. The term MWD system should be understood to encompass equipment and techniques for data transmission from within the well to the earth's surface.

Measurement of drilling parameters such as bit weight, torque, wear and bearing condition in real time provides for more efficient drilling operations. In fact, faster penetration rates, better trip planning, reduced equipment failures, fewer delays for directional surveys, and the elimination of a need to interrupt drilling for abnormal pressure detection is achievable using MWD techniques.

Common telemetry systems that have been used in an attempt to provide real-time data from the vicinity of the drill bit to the surface include mud pressure pulse systems, insulated conductor system, acoustic systems, and electromagnetic systems.

In a mud pressure pulse system, the resistance of mud flow through a drill string is modulated by means of a valve and control mechanism mounted in a drill collar near the bit and generates a pressure pulse that travels in the mud column to the surface. This type of system typically transmits data at low rates, typically less than 10 bits per second due to attenuation and distortion of the generated pulses.

An insulated conductor, or hard wire connection from MWD sensors to the surface, is an alternative method for establishing downhole communications. As used herein, the term insulated conductor means both electrical and optical conductors. This type of system is capable of a high data rate and high-speed two way communication is possible. This type of system may employ a special drill pipe and special tool joint connectors having the insulated conductors disposed therein. An alternative installation may use a cable within the pipe bore as the insulated conductor.

Acoustic systems have provided a third alternative. Typically, an acoustic signal is generated near the bit and is transmitted as stress waves through the wall of the drill pipe, or as pressure pulses or waves in the mud column. For acoustic signals transmitted as stress waves through the walls of the pipe, reflective and refractive interference resulting from changing diameters and thread makeup at the tool joints results in a reduced signal bandwidth. In addition, contact between the drill pipe and the borehole wall, such as may occur, for example, in a directional well, results in a very high level of signal attenuation that makes signal detection difficult at the surface.

The fourth technique used to telemeter downhole data to the surface uses the transmission of electromagnetic waves through the earth. A current carrying downhole data signal is input to a toroid or collar positioned adjacent to the drill bit or input directly to the drill string across an electrical isolator. When a toroid is utilized, a primary winding carrying the data for transmission, is wrapped around the toroid and a secondary winding is formed by the drill pipe. A receiver is connected to the ground at the surface where the electromagnetic data is picked up and recorded. It has been found, however, that in deep or noisy well applications, conventional electromagnetic systems experience difficulty in extracting the data signal from the ambient noise at the surface. The surface noise includes telluric noise as well as manmade noise from electric machinery and generators associated with the drilling process. In addition, electromagnetic noise may be generated by the movement of the conductive drill string in the wellbore. In addition, the attenuation of electromagnetic waves above about 20 Hz is extreme, resulting in very small signal at the surface. It is common that the noise source signals are significantly greater than the desired transmitted signals. While much of the noise can be removed from the surface measurements, the high attenuation and low transmission bandwidth limit the use of common electromagnetic techniques to relatively shallow depths and/or low bit rates.

All of the systems mentioned above employ some type of signal acquisition at the surface. In many cases, the presence of a rotating drill string makes optimal placement of the detection sensors a problem. For example, pressure pulse signals are commonly detected by a pressure transducer mounted upstream (closer to the pump) of a Kelly hose on a non-rotating portion of the fluid supply line. However, this location makes detection more difficult due to pressure pulse signal attenuation due to the compliant Kelly hose and due to reflections from pipe connections. Mounting of the pressure transducer on the rotating drill string, for example above the Kelly joint and before the Kelly hose, or within the rotating portion of a top drive, can provide superior detection. However, the transfer of the signal from the rotating framework to the stationary rig environment requires slip-rings or inductive couplers. Likewise, the use of hard-wired drill string connections, as described above, commonly requires slip rings or inductive couplers mounted on the Kelly to transfer the signal from the rotating to non-rotating environment, and vice versa. In addition, when a slip-ring or inductive coupler is used to transfer the signal from the rotating member to the stationary rig environment, a cable is commonly run through the top drive and along the Kelly hose to connect the slip-ring or inductive coupler with a surface controller for both signal and power transfer. These cables can pose repair and maintenance problems. Thus, there is a need for an improved surface telemetry system for use during wellbore operations.

SUMMARY OF THE DISCLOSURE

In one aspect of the present invention, a system for communicating data between a downhole tool and a surface controller comprises a rotating drill string extending in a borehole and having a downhole telemetry module disposed proximate a bottom end thereof and transmitting a first signal across a telemetry channel. A surface telemetry module is disposed proximate a top end of the rotating drill string and is adapted to receive the first signal transmitted by the downhole telemetry module across the transmission channel. The surface telemetry module include a radio frequency transmitter disposed therein for transmitting a second signal related to the first signal. A stationary communication module has a radio frequency receiver adapted to receive the second signal.

In another aspect, a method of communicating between a downhole tool and a surface controller comprises extending a rotating drill string, having a downhole telemetry module disposed proximate a bottom end thereof, in a borehole and transmitting a first signal across a telemetry channel. The first signal is received at a surface telemetry module mounted proximate a top end of the rotating drill string and transmits a second signal related to the first signal. The second signal is received at a stationary communication module.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims.

BRIEF DESCRIPTION OF THE DRAWINGS

For detailed understanding of the present invention, references should be made to the following detailed description of the embodiments, taken in conjunction with the accompanying drawings, in which like elements have been given like numerals, wherein.

DESCRIPTION OF EMBODIMENTS

Figure 1:
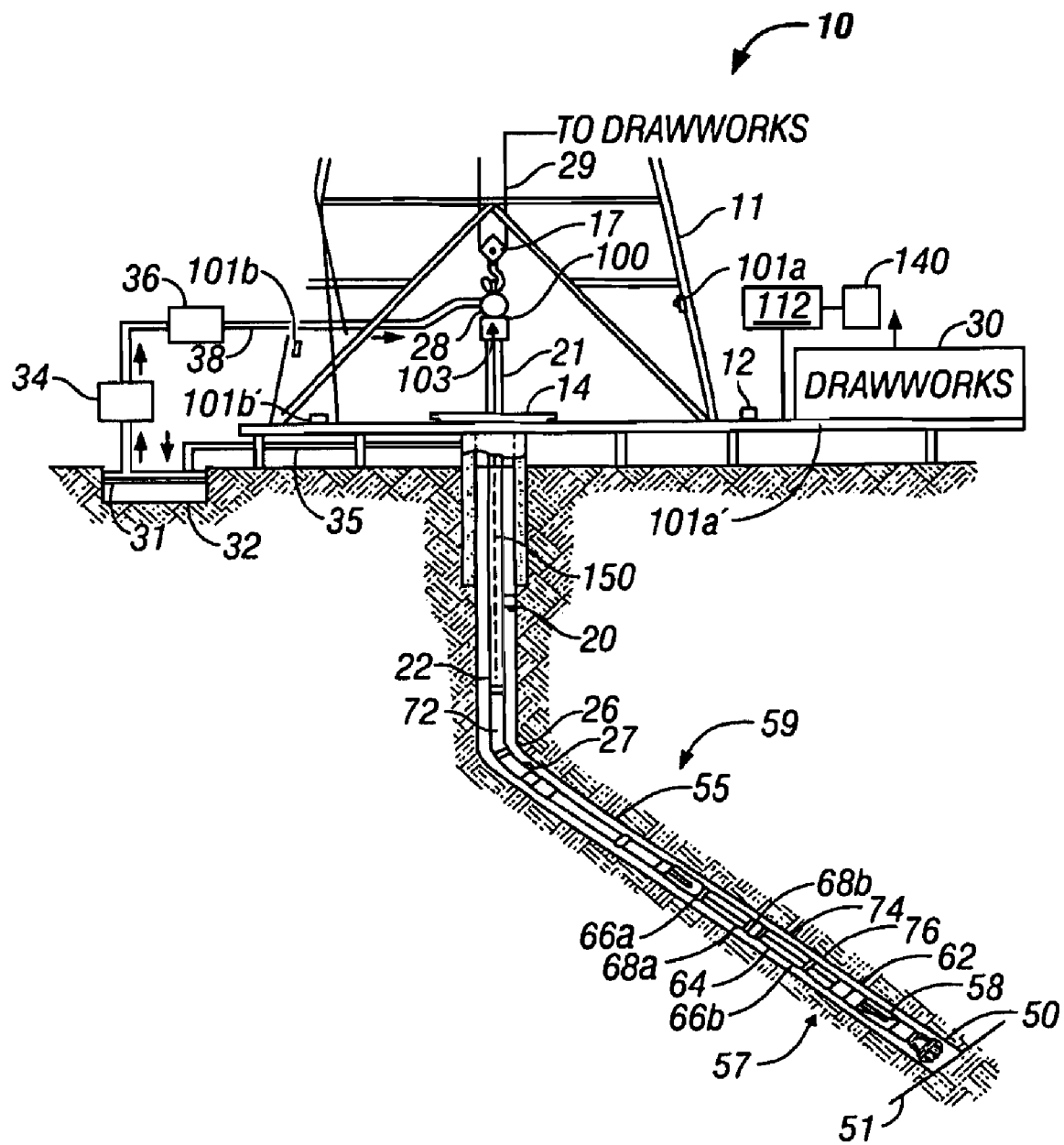
FIG. 1 is a schematic diagram of one embodiment of a drilling system having a radio frequency communication system according to one embodiment of the present invention.

FIG. 1 shows a schematic diagram of an exemplary drilling system 10. As shown, the system 10 includes a conventional derrick 11 erected on a derrick floor 12. A drill string 20 that includes a drill pipe section 22 that extends downward into a borehole 26. A drill bit 50 attached to the drill string at the downhole end disintegrates the geological formations when it is rotated. The drill string 20 is coupled to a drawworks 30 via a kelly joint 21, top drive 28 and line 29 through a system of pulleys 17. Top drive 28 provides power to rotate drill string 20. During drilling operations, the drawworks 30 is operated to control the weight on the drill bit 50 and the rate of penetration of the drill string 20 into the borehole 26. The operation of the drawworks 30 is well known in the art and is thus not described in detail herein.

During drilling operations, a suitable drilling fluid 31 (commonly referred to in the art as "mud") from a mud pit 32 is circulated under pressure through the drill string 20 by a mud pump 34. The drilling fluid 31 passes from the mud pump 34 into the drill string 20 via a desurger 36, fluid line 38, through a swivel (not shown) in top drive 28 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Alternatively, the kelly joint 21 may be driven by a drive table 14 disposed in derrick floor 12 that rotationally engages kelly joint 21 and also allows axial motion of the kelly joint through the drive table. Such a drive system is known in the art, and is not described here further.

In one embodiment, a drilling motor or mud motor 55 coupled to the drill bit 50 via a drive shaft (not shown) disposed in a bearing assembly 57 also rotates the drill bit 50 when the drilling fluid 31 is passed through the mud motor 55 under pressure. The bearing assembly 57 supports the radial and axial forces of the drill bit 50, the downthrust of the drill motor 55 and the reactive upward loading from the applied weight on bit. A stabilizer 58 coupled to the bearing assembly 57 acts as a centralizer for the lowermost portion of the mud motor assembly.

The downhole subassembly 59 (also referred to as the bottomhole assembly or "BHA"), which contains the various sensors and MWD devices that provide information about the formation and downhole drilling parameters relating to the drill string, including the mud motor, is coupled between the drill bit 50 and the drill pipe 22. The downhole assembly 59 may be modular in construction, in that the various devices are interconnected sections so that the individual sections may be replaced when desired.

Still referring to FIG. 1, the BHA also contains sensors and devices in addition to the above-described sensors. Such devices include a device 64 for measuring the formation resistivity near and/or in front of the drillbit 50, a gamma ray device 76 for measuring the formation gamma ray intensity and devices for determining the inclination and azimuth of the drill string 20. The formation resistivity measuring device 64 is preferably coupled above the lower kick-off subassembly 62 that provides signals, from which resistivity of the formation near or in front of the drill bit 50 is determined. A dual propagation resistivity device ("DPR") having one or more pairs of transmitting antennae 66a and 66b spaced from one or more pairs of receiving antennae 68a and 68b may be used. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole circuit that is typically placed in a housing above the mud motor 55 and transmitted to a surface using a suitable downhole telemetry system 72.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device may be utilized for the purposes of this invention. In addition, an azimuth device (not shown), such as a magnetometer or a gyroscopic device, may be used to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternative embodiment of the drill string 20, the mud motor 55 may be coupled below the resistivity measuring device 64 or at any other suitable place.

The downhole assembly 59 may include an MWD section that contains a nuclear formation porosity measuring device, a nuclear density device and an acoustic sensor system placed above the mud motor 55 for providing information useful for evaluating and testing subsurface formations along borehole 26. The present invention may utilize any suitable formation density device. Any density device using a gamma ray source may be used. In use, gamma rays emitted from a source enter the formation where they interact with the formation and attenuate. The attenuation of the gamma rays is measured by a suitable detector from which density of the formation is determined.

An exemplary porosity measurement device may employ a neutron emission source and a detector for measuring the resulting gamma rays. In use, high energy neutrons are emitted into the surrounding formation. A suitable detector measures the neutron energy delay due to interaction with hydrogen and atoms present in the formation.

The above-noted devices transmit data to the downhole telemetry system 72, which in turn transmits the received data uphole to the surface control unit 112 via a suitable communications link or channel. The downhole telemetry system 72 also receives signals and data from the uphole control unit 112 and transmits such received signals and data to the appropriate downhole devices.

In one embodiment, the present invention utilizes a wired-pipe telemetry technique to communicate data between downhole sensors and devices and a surface telemetry system during drilling operations. As shown in FIG. 1, in such a configuration, an electrical conductor 150 is mounted along the length of each individual section of pipe with electrical and/or inductive connections at each threaded joint between pipe sections. The electrical wire may be run in conduit (not shown) within the bore of each pipe section. Such a system is disclosed in U.S. Pat. No. 6,670,880 to Hall et al. and is incorporated herein by reference. Alternatively, any other suitable technique for running an electrical conductor from downhole to the surface may be used.

Still referring to FIG. 1, the present invention provides a surface telemetry system that provides bi-directional data communication with the downhole telemetry system 72. The surface telemetry system includes a wireless transmitter or a transmitter and receiver (trans/receiver) module 100, a plurality of wireless receivers, such as receivers 101a and 101b, or 101a' and 101b' (collectively designated by numeral 101) that are located spaced apart at suitable locations around the mast 11 and/or proximate the derrick floor 12 and a surface control unit or a controller 112.

In one aspect, the trans/receiver module 100 may be placed so that it rotates with the drill string and in another aspect, the module 100 may be non-rotating. FIG. 1 shows that the module 100 is coupled to the communications link 150 and placed in the drill pipe below a top drive 28 that rotates the drill pipe 21.

In one embodiment, the trans/receiver 100 is placed in a module or sub that is attached to a rotating section of the drill string, as shown and described in reference to FIG. 1A below. In another aspect, the module 100 may be placed in a top drive, such as top drive 28. The module 100 may also be an integral part of the top drive 28. In another aspect, the module 100 may be non-rotating as described in reference to FIG. 1B below. In the configuration of FIG. 1, the module 100 that includes a trans/receiver 103 is coupled to the link 150 for receiving signals from and transmitting signals to the downhole telemetry system 72. If drilling fluid or mud is used as a communication link between the surface and downhole telemetry systems, a pressure sensor and associated circuitry is included in the module 100 to generate signals that correspond to the signals transmitted from a downhole pressure pulser.

Figure 1A:
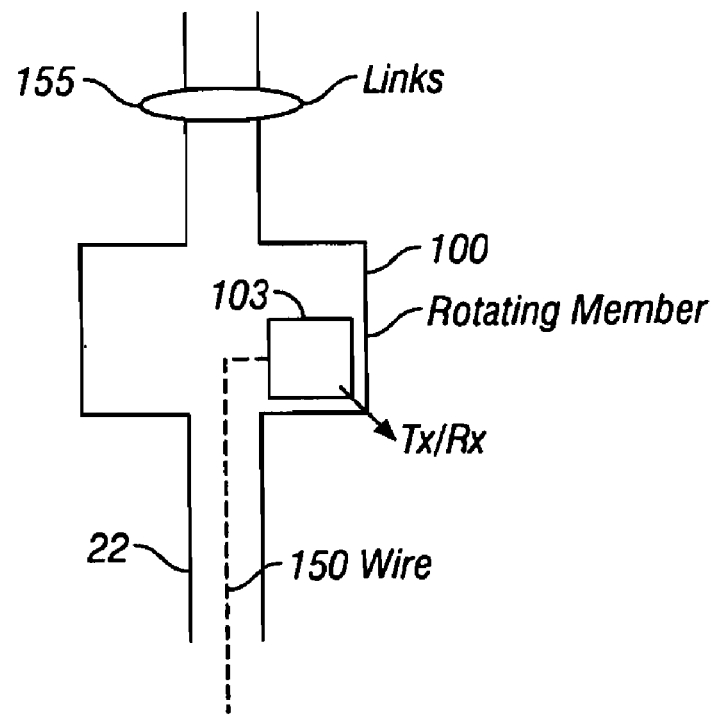
FIG. 1A is a schematic diagram showing placement of a trans/receiver according to one embodiment of the present invention.
Figure 1B:
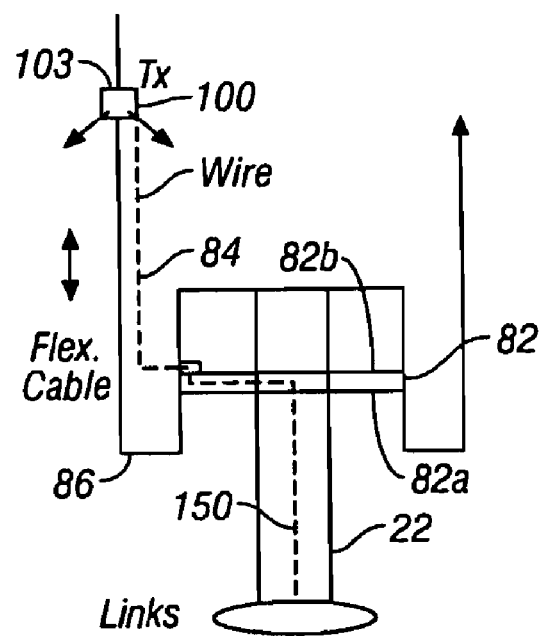
FIG. 1B is a schematic diagram showing placement of a trans/receiver according to another embodiment of the present invention.

In the configuration of FIG. 1A, the module 100 is attached to drill pipe 21 and coupled to the wire link 150. In this embodiment, the module 100 that contains the trans/receiver 103 and associated circuitry and devices rotate with the drill string. The module 100 may be placed below the links 155, which are shown to be below the top drive 28 of FIG. 1. In the embodiment of FIG. 1B, the module 100 that contains the trans/receiver 103 and associated circuitry and devices is non-rotating and is shown attached to a flexible cable 86 that moves down with the drill pipe 22 as the well is drilled and moves up when a new drill pipe section is added to the drill string. The wire link 150 terminates at a coupling device 82 that transfers the signals received from the downhole system 72 between a rotating member 82a to a non-rotating member 82b. The module 100 is coupled to the non-rotating member 82b by a link 84, which may be any suitable link, including a wire connection or a fiber optic link. In one aspect, the coupling device 82 may be a slip ring type device that transfers data and power between the rotating and non-rotating members 82a and 82b. In another aspect, the coupling device 82 may be an inductive coupling device or another suitable device.

In the surface telemetry system, the multiple receivers may be located at any suitable location. A drilling rig, such as shown in FIG. 1 or an offshore platform (not shown) includes a large number of metallic and electrical equipment introduces noise that can interfere or corrupt wireless signals transmitted from the module 100 and thus the number of receivers and location thereof may be selected depending upon the size and shape of the rig structure.

Figure 2:
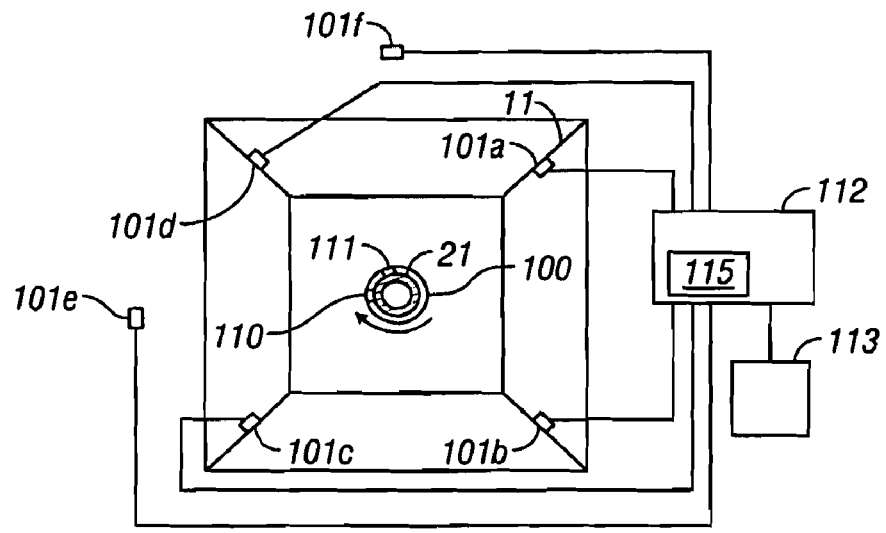
FIG. 2 is a plan view showing placement of an exemplary transmitter and a plurality of receivers at a surface of a drilling system according to one embodiment of the present invention.

FIG. 2 shows a plan view of the placement and interconnection of certain components of the surface telemetry system including multiple receivers according to one embodiment of the invention. As shown in FIG. 2, receivers 101a-101d are placed around the mast 11, while the module 100 containing the trans/receiver is connected to the drill pipe 21. One or more receivers, such as receivers 101e and 101f, may be placed a certain distance away from the mast 11. Thus, the system may include multiple spaced apart receivers, each receiver being connected to the controller 112. The controller further may include a router 115 that performs an error-detection and error-correction scheme on the signals received from the receivers 101a-101f and passes the signals that meet a selected criterion to the processor of the controller 112 for further processing, as described in more detail later. The controller 112 may be coupled (directly or via a wireless connection to a remote cite 113, such as a client office). Controller 112 includes the peripherals connected to the controller.

The surface control unit 112 receives signals from and transmits commands and information to the downhole sensors and devices via the surface telemetry module 100 as described in more detail below. In one embodiment, the surface telemetry system is a bidirectional telemetry system that includes the surface control unit 112 that processes signals received from the downhole devices and transmits commands signals and other information to the downhole devices. The surface control unit 112 processes signals (also referred to herein as data signals) according to programmed instructions provided to the surface control unit. The surface control unit 112 contains a computer or processor, memory for storing data, computer programs, models and algorithms, a data recorder and other peripherals, collectively designated by numeral 140. The surface control unit 112 uses the models and algorithms to process data according to programmed instructions and responds to user commands entered through a suitable device, such as a keyboard. The surface control unit 112 displays desired drilling parameters and other information on a display/monitor 140, and the displayed information is used by an operator to control the drilling operations.

Figure 3:
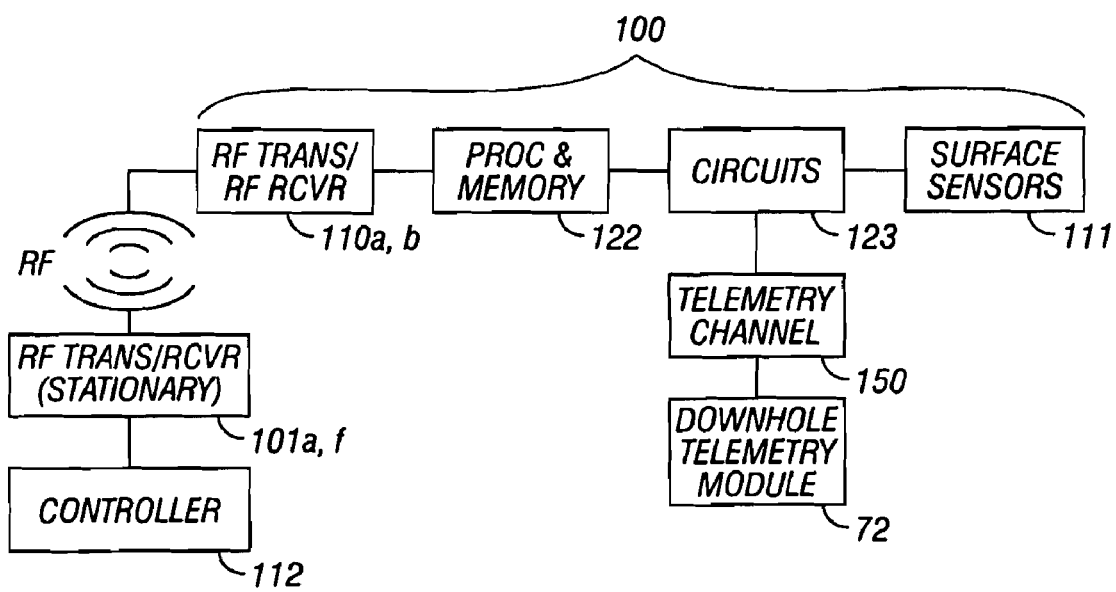
FIG. 3 is a block functional diagram of a telemetry system according to one embodiment of the present invention.

FIG. 3 shows a functional block diagram of the telemetry system according to one aspect of the invention. In one aspect, the module 100 includes an interface circuitry 123, a processor having a memory 122, a radio frequency (RF) transmitter 110a and a receiver 110b, which in one embodiment also may be an RF receiver. Transmitter 110a and receiver 110b may be integrated into a single unit or alternatively may be separate devices in the module 100. Module 100 may be powered by batteries (not shown) or another suitable means.

The operation of the telemetry system is described below while referring to FIGS. 1-3. During operation of the drilling system 10, data from downhole sensors is transmitted to the surface by the downhole telemetry module 72 via the communications channel or link 150. The surface telemetry module 100 receives signals from and transmits signals to the downhole telemetry module 72 via the communication link 150. The interface circuits 123 associated with the module 100 receive and process the downhole signals and provide the processed signals to the processor 122. The transmitter 110a, while rotating, transmits wirelessly the received signals in the form of data blocks or packets toward the receivers 101a-101f. The data bits to be transmitted are encoded with error detection and correction bits using a suitable coding scheme. The coding scheme typically adds the parity bits to the data bits. Thus, each transmitted data packet includes a certain number of data bits and a certain number of error detection and correction bits. The processor 122, using programs and the coding schemes, encodes the data bits. Such programs and coding schemes are stored in memory associated with the processor. The transmitter section 110a transmits the data signals provided to it by the processor. The transmitter 110a also may include an antenna that directs the data signals to the receivers. The transmitter and receiver configurations described herein provide an omni-directional or a substantially omni-directional transmission system.

The processor 122 controls the operation of the transmitter 110a. In one aspect, the transmitter transmits the signals at a preselected frequency. In another aspect, the processor can change the frequency of operation of the transmitter by selecting a frequency from among a group or range of frequencies. Any suitable frequency may be used for the system of this invention. A transmission frequency of 2.4 GHz and 5.4 GHz have been found to operate satisfactorily with the receivers, such as receivers 101a-101f, placed around the mast 11.

Due to the nature of the metallic structure and due to the movement of metal objects around the rig and other factors, signals received by the receivers can have errors, such as missing bits, incorrect bits, etc. However, the error is often not the same for each receiver and the error can be at different times for any receiver. In one aspect, the processor 122 causes the transmitter 110a to transmit each signal, which is received by one or more receivers in the plurality of receivers and than a selection is made as to which receiver has monitored the correct data signals. This can enable each receiver to receive the same signal, i.e., the same data packet corresponding to a particular signal. Such a method can in affect provide omni-directional transmission of data signals. The present disclosure provides an apparatus and method that can select or use error-free signals from the receivers and discard the ones that have errors. The system, due to the presence of multiple receivers, also provides redundancy. In one aspect, the signals from each receiver are first sent to a router 115, which includes circuitry and a processor that applies an error detection and correction code, scheme or algorithm to the data packets received by each receiver to determine if the received signal corresponds to the transmitted signal, i.e., that the received signal is error free. In some instances, the error detection and correction scheme or algorithm can correct the error and in such instances the corrected signal will be error free. If the received signal from a receiver meets this criterion, then the router sends the signal to the processor 112 for further processing. If a data packet from a particular receiver has an error that can not be corrected, the router looks to the signals from the next receiver and so on. In one method, the router continues to send signals from a receiver (e.g. the first receiver) as long as that receiver is providing error-free signals. When an error from such a receiver is detected that cannot be corrected, the router sends the signals from the next receiver that meets the error criterion and continues to send signals from such next receiver until an error signal is detected. The router in this manner continues to switch to other receivers in the system. Any suitable error detection and correction or encoding and decoding scheme algorithm or code may be used for the purpose of this invention. Reed-Solomon codes have been found to be applicable for the system and methods of this invention. Reed-Solomon codes are known in the art and are thus not described in detail herein. When a non-rotating RF transmitter, such as shown in FIG. 1B, is used, the RF signals may be directed to one or more particular receivers.

To transmit surface signals downhole, a transmitter associated with the surface controller 112 wirelessly transmits such signals to the receiver 110b in the rotating module 100, which signals are processed and sent by the transmitter 110a to the downhole telemetry module 72 via link 150.

The transmitter 110a may also be used to send signals from multiple sensors in the drill string. In another aspect, the surface telemetry module 100 may include any number of sensors 111 for measuring various parameters, including surface drilling parameters. The sensor 111 measures parameters that include, but are not limited to, hook load, drillstring torque, drilling fluid pressure, rotary speed, and temperature. These parameters may be transmitted as raw and/or processed data to surface controller 112 via communication modules 101a-f. In operation, a hard wired system as described herein may have telemetry of any suitable data rate. As an example, the data rates may be 100 kilobits per second (kbps) to about 2 megabits per second (mbps), 4 megabits per second, etc. Such telemetry rates are highly useful in closed loop drilling and/or geosteering operations known in the art. In one embodiment, such high data rates enable vertical seismic profiling using multiple seismic receivers in the downhole assembly.

Thus, in one aspect the present invention provides a telemetry system for use in a drilling system that includes a rotating transmitter associated with the drilling system that transmits data signals wirelessly; a plurality of spaced apart receivers, each such receiver receiving the transmitted data signals; and a processor that receives the data signals from each of the receivers in the plurality of receivers and processes the data signals from the receivers that meet a selected criterion. The transmitter may be placed in a drill string such as attached to a drill pipe or drill stem or placed in a top drive that rotates the drill string. The transmitter module maybe an integral part of the top drive. In one aspect, the processor applies an error detection and correction scheme to the data signals received by each of the receivers and processes signals that meet the selected criterion. The selected criterion may be that the data signal received by a receiver is error free; or that the data signal has been made error free by using an error correction scheme. In one aspect, the receivers in the plurality of receivers are placed around a mast and/or at other locations so that multiple receivers can receive the same data signal as a packet when the transmitter sends the data signal. In another aspect, the transmitter transmits each data signal a plurality of times so as to provide an effect of substantially omni-directional transmission of the data signals to the receivers. The transmitter receives the data signals from a downhole location via a data communication link associated with a drill string, which may be a wire link that carries data signals from a downhole device, a mud column associated with a drill string that carries data signals from a downhole device, or a fiber optic link associated with a drill string. In another aspect, a processor associated with the transmitter encodes the data signals with parity bits and the processor that receives the data signals from the receiver decodes the received data signals and corrects the data signals upon detection of an error in the received data signals. In yet another aspect, a router coupled to each receiver determines which data signals from each receiver in the plurality of signals are used. The transmitted signals may include parity bits based on a Reed-Solomon code, and the processor uses Reed-Solomon code to detect errors in the data signals received by the receivers. The transmitter can transmit the data signals at any selected frequency including 2.4 GHz and 5.4 GHz. In one aspect an 80 MHz of 2.4 to 2.4835 GHz band may be used. A suitable data bit rate, such as 500 k bits/sec., 1 m bits/sec or 2 m bits/sec, etc. may be used. The data rates can be selected with a trade off in error rate.

The present disclosure also provides a method for use in wellbore operations, that includes: transmitting data signals wirelessly from a rotating transmitter associated with a drilling system; receiving the transmitted data signals at a plurality of spaced apart receivers; and processing data signals from each receiver in the plurality of receivers that meet a selected criterion. The transmitter may be placed in a drill string or in a top drive that rotates a drill string. The telemetry method may apply an error detection and correction scheme to the data signals received by each of the receivers and process the data signals from each of the receivers that meet the selected criterion. The multiple receivers are placed around the drilling system and the transmitter transmits each data signal as a packet of bits that include parity bits. The data signals are transmitted to the receivers in a manner that provides an effect of substantially omni-directional transmission of the data signals to the receivers. In one aspect, the transmitter transmits each data signal a plurality of times to ensure that each receiver receives the same data signal.

The method further provides for transmitting encoded data signals with parity bits before transmitting the data signals and decoding the data signals from the receivers before processing the data signals. The method further provides correcting the data signals upon detection of an error in the received data signals using a suitable error detection and correction scheme or code. In the method, signals from a receiver are processed as long as the received signals are error free and have been corrected. The method switches between receivers to obtain error free signals. In another aspect, the disclosure provides a telemetry system for use in a wellbore operation that includes a data communication link in a drill string that rotates with the drill string and carries data signals between a downhole device and a surface location; a coupling device coupled to the data communication link that transfers data signals from the rotating data communications link to a non-rotating member; a transmitter coupled to the non-rotating member that receives the data signals and wirelessly transmits the received data signals at a selected frequency; at least one receiver that receives the data signals from the transmitter; and a processor at the surface that processes the received data signals.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

The invention claimed is:

1. An apparatus for use in a wellbore operation, comprising:
   a data communication link in a rotating member configured to carry data signals between a downhole device and a surface location;
   a non-rotating transmitter configured to receive the data signals from the rotating member and transmit the received data signals wirelessly;
   a plurality of receivers placed around the transmitter configured to receive the data signals from the transmitter;
   a router coupled to the plurality of receivers and configured to determine which of the data signals from each receiver in the plurality of receivers is to be processed; and
   a controller configured to process the received data signals by the plurality of receivers that meet a selected criterion.

2. The apparatus of claim 1, wherein the selected criterion is one of that: a selected data signal received by the plurality of receivers is error free; and a selected data signal received by the plurality of receivers has been made error free.

3. The apparatus of claim 1, wherein the controller includes a router configured to apply an error detection and correction scheme to the data signals received by the plurality of receivers.

4. The apparatus of claim 1, wherein the router coupled to the plurality of receivers comprises a plurality of routers coupled to each receiver in the plurality of receivers.

5. The apparatus of claim 4, wherein the transmitter is configured to transmit each data signal as a packet of bits that includes one or more parity bits.

6. The apparatus of claim 1, wherein a processor associated with the transmitter encodes the data signals with one or more parity bits and the controller is configured to decode the data signals received by the plurality of receivers and correct such received data signals upon detection of an error in the received data signals.

7. The apparatus of claim 4, wherein the router is configured to continue to process the data signals from a first receiver in the plurality of receivers until a signal from the first receiver fails to meet the selected criterion and then switch to process the data signals from a second receiver in the plurality of receivers.

8. The apparatus of claim 4, wherein the plurality of receivers are placed so that more than one receiver in the plurality of receivers receives the data signals transmitted by the transmitter.

9. The apparatus of claim 1 further comprising a data transfer device configured to transfer the data signals from the rotating data link to the non-rotating transmitter.

10. The apparatus of claim 1, wherein the data communication link is one of: a wire link that carries data signals from the downhole device; and a fiber optic link that carries data signals from the downhole device.

11. The apparatus of claim 9, wherein the data transfer device is one of: an electrical coupling device, a fiber optic coupling device, an inductive device, and an acoustic device.

12. The apparatus of claim 5, wherein the parity bits are based on a Reed-Solomon code and the controller is configured to use the Reed-Solomon code to detect errors in the data signals received by the plurality of receivers.

13. A telemetry method for use in a drilling system, comprising:
receiving data signals sent from a downhole location to the surface via a communication link placed in a rotating member disposed in a wellbore;
transmitting data signals received at the surface location wirelessly by a stationary transmitter;
receiving the transmitted data signals plurality of receivers placed spaced from the transmitter, wherein a router is coupled to the plurality of receivers and is configured to determine which of the data signals from each receiver in the plurality of receivers is to be processed; and
processing data signals received by the plurality of receivers that meet a selected criterion.

14. The telemetry method of claim 13, wherein transmitting the data signals comprises transmitting each data signal as a packet of bits that includes parity bits.

15. The telemetry method of claim 13 further comprising applying an error detection and correction scheme to the data signals received by the at least one receiver to correct the data signals that fail to meet the selected criterion.

16. The telemetry method of claim 15 further comprising processing the data signals from the plurality of receivers that meet the selected criterion.

17. The telemetry method of claim 13, wherein the receivers in the plurality of the receivers are placed in a manner that enables each such receiver to receive the transmitted data signals.

18. The telemetry method of claim 13 further comprising encoding the data signals with parity bits before transmitting the data signals and decoding and correcting the data signals that fail to meet the selected criterion before processing the data signals.

19. The telemetry method of claim 13 further comprising encoding the data signals with parity bits using a Reed-Solomon code before transmitting such data signals and decoding and correcting the data signals received by the at least one receiver using the Reed-Solomon code before processing such received signals.

* * * * *